June 13, 1939.  L. T. WILSON  2,162,659
FISHING LINE BOBBER
Filed Feb. 16, 1938
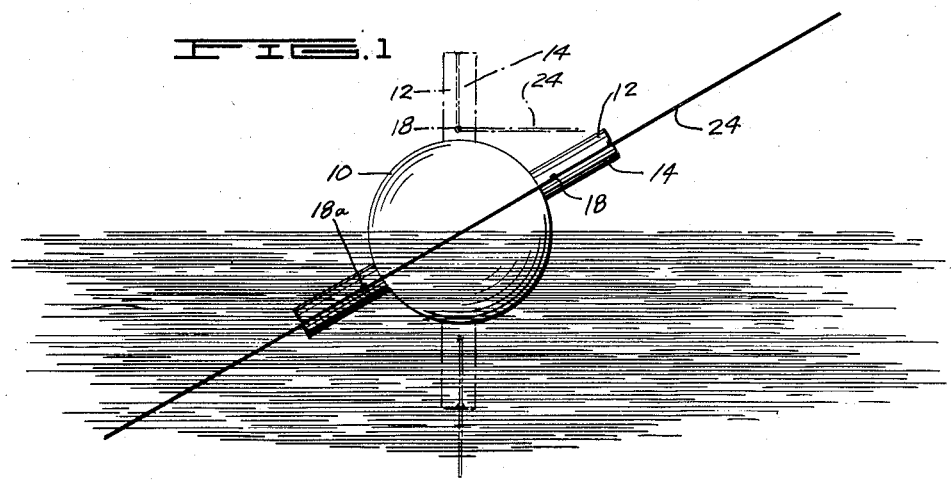
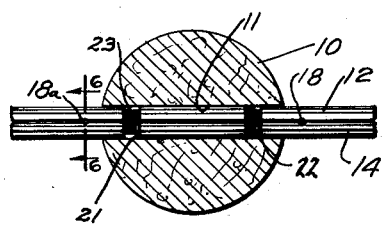
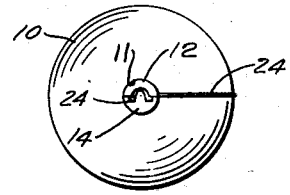
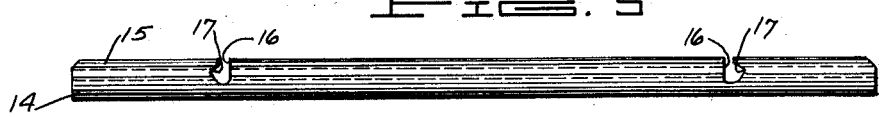
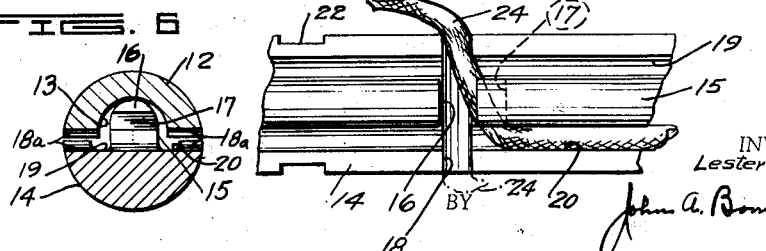
INVENTOR.
Lester T. Wilson
BY
ATTORNEY.

Patented June 13, 1939

2,162,659

UNITED STATES PATENT OFFICE 2,162,659

FISHING LINE BOBBER

Lester T. Wilson, Willoughby, Ohio

Application February 16, 1938, Serial No. 190,685

4 Claims. (Cl. 43—49)

My invention relates to floats or bobbers for fishing lines and in particular to a type of bobber which may be attached at any place on a line without disassembling the line, hook etc.

One object is to provide a device of simple construction, which is easy to mount or dismount and which will provide a positive locking means when a definite pull is made on the line.

Another object is to provide a device having no metal parts or attachments which might entangle the line.

These and other objects and advantages may be noted from the following specification and its accompanying illustrations in which:

Fig. 1 shows the bobber mounted on a line, the dot-dash lines indicating the floating position and the solid lines indicating the locked position which becomes automatc upon a definite pull on the line.

Fig. 2 shows a view of the device similar to Fig. 1 but with the ball or cork shown in section.

Fig. 3 is an end view of the device.

Fig. 4 is a sectional view of the top or groove portion of the split locking device.

Fig. 5 is an elevation of the bottom or tongue portion of the split locking device.

Fig. 6 is a greatly enlarged section on lines 6—6 of the split locking device shown in Fig. 2.

Fig. 7 is an enlarged fragmentary top plan view of the tongue portion showing the method of locking.

Again referring to the illustrations, the bobber float 10 is preferably made of a light weight material such as cork and has a bore 11 therethrough. A tubular split locking stem or quill consists of the upper portion 12, which is longitudinally grooved at 13 through its entire length, and a bottom portion 14 having a tongue 15 disposed longitudinally through its entire length except at two points where the tongue is slotted at 16 and undercut at 17 to form the locking device or notch.

Transverse apertures 18 and 18a through the split locking portion and adjacent the outer ends thereof, are formed by half-round grooves in the top and bottom portions of the split locking device registering with each other when assembled, said apertures intersecting the locking mediums.

Grooves 19 and 20 are longitudinally disposed at each side of the base of the tongue 15 of the bottom portion of the split locking device.

The split locking device may be shouldered at 21 and 22 as shown in Fig. 2; in the top and bottom portions 12 and 14 respectively, when assembled in such manner as to cause the tongue 15 and groove 13 and the apertures 18 and the locking mediums respectively, to register with each other, and may be secured together by thread 23 or the like within said shouldered portions or may be cemented together within the limitations of the shouldered portions and mounted rigidly within the bore 11 in the bobber ball 10.

In use the line 24 is inserted crosswise in the end of the split locking device, between the top portion 12 and the bottom portion 14, and drawn back until the said line enters the transverse aperture 18, the line is then drawn around the bobber ball 10 and inserted, crosswise in the opposed end of the split locking device in the same manner as hereinabove described, the line 24 being drawn back until it enters the transverse aperture 18a, whereupon the assembled bobber assumes, in water, the position indicated by dot-dash lines in Fig. 1.

A pull on the line 24 causes the ends of the line 24 to snap into the locked position shown by the solid lines in Fig. 1, wherein the said line enters the undercut portions 17 in the tongue 15 at each side of the bobber ball 10 and passing through the groove 19 or 20 (depending upon which side of the bobber ball the line is secured over) exits through the opposed split ends of the tubular locking device or stem.

I claim:

1. A fishing line bobber comprising a float having a hole therethrough, and a stem fitting through the hole, the stem having internal longitudinal grooves and openings into said grooves beyond opposite ends of the float, through which openings and grooves the line extends when the bobber is mounted thereon.

2. A fishing line bobber as in claim 1, the stem also having notches at the intersections of the grooves and openings, in which notches the line engages.

3. A fishing line bobber comprising a float having a bore therethrough, and a stem fitting through the bore, said stem embodying two parts with a tongue and groove joint therebetween, one part also having a longitudinal groove to receive the line, the stem also having openings at opposite sides of the float communicating with said longitudinal groove, and through which openings the line extends.

4. A fishing line bobber as in claim 3, the said tongue having line-engaging notches at the intersection of said longitudinal groove and openings.

LESTER T. WILSON.